United States Patent
Linnersten et al.

[11] Patent Number: 6,152,996
[45] Date of Patent: Nov. 28, 2000

[54] AIR CLEANER ELEMENT HAVING INCORPORATED SORPTION ELEMENT

[75] Inventors: Staffan B. Linnersten, Broadview Heights; Patrick J. Fleming, Cuyahoga Falls, both of Ohio

[73] Assignee: Air-Maze Corporation, Stow, Ohio

[21] Appl. No.: 09/035,440

[22] Filed: Mar. 5, 1998

Related U.S. Application Data

[60] Provisional application No. 60/039,136, Mar. 5, 1997.

[51] Int. Cl.⁷ .................................................. B01D 53/04
[52] U.S. Cl. ................................ 96/135; 96/142; 96/153; 55/385.3; 55/483; 55/486; 55/497; 55/521
[58] Field of Search .............................. 96/108, 134–141, 96/158, 154; 55/385.1, 385.3, 483, 486–489, 497, 498, 507, 521, 523

[56] References Cited

U.S. PATENT DOCUMENTS

| | | | |
|---|---|---|---|
| 3,252,270 | 5/1966 | Pall et al. | 96/134 X |
| 3,456,635 | 7/1969 | Hervert | 96/135 X |
| 3,721,072 | 3/1973 | Clapham | 96/153 |
| 3,747,303 | 7/1973 | Jordan | 96/135 |
| 4,130,487 | 12/1978 | Hunter et al. | 96/154 X |
| 4,252,547 | 2/1981 | Johnson | 96/139 X |
| 4,322,230 | 3/1982 | Schoen et al. | 96/138 |
| 4,339,250 | 7/1982 | Thut | 96/139 X |
| 4,385,911 | 5/1983 | Popeil et al. | 96/136 X |
| 4,418,662 | 12/1983 | Engler et al. | 96/134 X |
| 4,514,197 | 4/1985 | Armbruster | 96/138 |
| 4,558,636 | 12/1985 | Malmstrom et al. | 96/139 X |
| 4,559,066 | 12/1985 | Hunter et al. | 96/139 X |
| 4,594,083 | 6/1986 | Hiraizumi | 55/385.3 |
| 4,664,683 | 5/1987 | Degen et al. | 55/524 X |
| 4,684,381 | 8/1987 | Wasylyniuk | 55/385.3 X |
| 4,701,195 | 10/1987 | Rosendall | 96/136 |
| 4,714,486 | 12/1987 | Silverthorn | 96/134 |
| 4,737,173 | 4/1988 | Kudirka et al. | 96/153 X |
| 4,810,269 | 3/1989 | Stackhouse et al. | |
| 4,838,901 | 6/1989 | Schmidt et al. | |
| 4,865,637 | 9/1989 | Gruber | 96/136 |
| 5,087,276 | 2/1992 | Snyder | 96/134 X |
| 5,129,929 | 7/1992 | Linnersten | 96/134 X |
| 5,147,722 | 9/1992 | Koslow | |
| 5,189,092 | 2/1993 | Koslow | |
| 5,226,937 | 7/1993 | Linnersten et al. | 96/134 X |
| 5,288,298 | 2/1994 | Aston | 96/135 |
| 5,288,469 | 2/1994 | Skalla | 96/134 X |
| 5,290,330 | 3/1994 | Tepper et al. | |
| 5,302,354 | 4/1994 | Watvedt et al. | |
| 5,331,037 | 7/1994 | Koslow | |
| 5,332,426 | 7/1994 | Tang et al. | 96/153 |
| 5,350,444 | 9/1994 | Gould et al. | 96/154 |
| 5,423,903 | 6/1995 | Schmitz et al. | 96/134 |
| 5,464,533 | 11/1995 | Koslow | |
| 5,484,466 | 1/1996 | Brown et al. | 55/521 X |
| 5,509,948 | 4/1996 | Keller et al. | |
| 5,538,647 | 7/1996 | Koslow | |
| 5,620,505 | 4/1997 | Koch et al. | 96/134 |
| 5,641,343 | 6/1997 | Frey | 96/153 X |
| 5,714,126 | 2/1998 | Frund | 96/135 X |
| 5,755,842 | 5/1998 | Patel et al. | 55/385.3 X |
| 5,800,581 | 9/1998 | Gielink et al. | 55/385.3 |

FOREIGN PATENT DOCUMENTS

| | | |
|---|---|---|
| 0 418 563 A1 | 3/1991 | European Pat. Off. . |
| 44 40 489 A1 | 5/1996 | Germany . |

*Primary Examiner*—Robert H. Spitzer
*Attorney, Agent, or Firm*—Rankin, Hill, Porter & Clark LLP

[57] ABSTRACT

A gaseous cleaner element comprising a housing having a gas inlet and a gas outlet with a gas stream formed therebetween. An immobilized mass of sorption material formed in a desired shape is mounted in the housing, the gas stream passing therethrough. A particulate filter layer is mounted in the housing adjacent to the mass, the gas stream passing therethrough. The particulate filter layer is mounted upstream of the sorption material mass. The air cleaner element can be used as a replacement to existing filter elements to provide sorption and particulate filtering to air circulation systems such as cabin air filter systems.

15 Claims, 5 Drawing Sheets

AIR CLEANER ELEMENT HAVING INCORPORATED SORPTION ELEMENT

CROSS REFERENCE TO RELATED APPLICATION

This application is based upon Provisional Application Serial No. 60/039,136, filed Mar. 5, 1997.

BACKGROUND OF THE INVENTION

1. Field of the Invention

This invention relates to air and gas cleaners, and more particularly to air cleaners having replaceable filter elements that include an integrated or connected sorption filter.

2. Description of the Prior Art

In air filter and air and gas cleaner systems it is sometimes necessary to have a particulate filter to remove suspended particulate material from the air or gas combined with a sorbent filter to remove odors and gaseous and/or vaporous impurities. While the particulate filter may be effective in removing dust and particulate impurities in the air stream, it does not effectively remove such odors or gaseous and/or vaporous impurities. The sorbent filter is a vapor or vapor/gas phase filter, usually formed of carbon particles, which has the capability of removing vapor or gas molecules from the air stream that can cause odors or odorless, harmful, non-desirable compounds, and which may otherwise contaminate the air flow. The sorbent filter may work by adsorption or chemisorption.

For example, in ventilation systems for enclosed cabins, such as those used by the operators of agricultural equipment, effective air filtration is important because of the dust and agricultural chemicals encountered. Likewise, in commercial aircraft, effective air filtration is important due to contaminants and odors which may be contained in the aircraft cabin, such as body odors, cooking odors and phenolics from upholstery and interior material. Air filters should be effective in removing dust and particulate material from the air, and for this purpose high efficiency particulate air (HEPA) filters or ultra low penetration air (ULPA) filters are desirable. In addition, a sorption filter is desirable to remove unwanted gaseous or vaporous chemicals in the air flow. However, a sorption filter usually requires additional equipment to channel the air flow through a layer of sorbent material.

In addition, it is usually very difficult to provide layers of sorbent material in conventional filter air streams, since the sorbent material is often loose particles or granules or spherical pieces of carbon material which tend to settle. When the particles settle, it causes "channeling" which substantially reduces the effectiveness of the sorption filter. Carbon beds have utilized several different approaches to reduce the effects of carbon bed settling, such as pressure pads, spring-loaded follower plates, and other devices. However, all of these approaches require additional bulky and complex equipment.

SUMMARY OF THE INVENTION

The present invention overcomes these and other problems of the prior art and provides other advantages that have not been realized heretofore. The present invention provides an air or gas cleaner which includes a layer of sorbent material and which can fit into existing filter housings. Using the present invention, it is possible to replace the filter element in existing air cleaners with a filter/sorbent combination air cleaner element to provide the advantages of sorption filtering without additional equipment. The present invention eliminates the need for additional complex, bulky, ineffective and expensive sorbent cleaning equipment.

The air cleaner element of the present invention provides for increased capabilities for filtering particulate material as well as gaseous or vaporous odors or impurities in cabin ventilation systems for agriculture equipment or for commercial aircraft or for military aircraft or tanks or the like, or for the removal of volatiles as well as particulates in compressed air systems, and for use as personal respirators, including those used in military applications. The air cleaner can be made completely disposable, so that there is no need for potential contact with toxic substances after removal.

The air cleaner element of the present invention can be designed to fit existing housing configurations, thus eliminating the need for modification to various components of the air handling system, such as the blower or motor. This allows a trouble-free configuration implementation for production and retrofit. No additional tools are required for production and servicing of the air cleaner element.

The drop-in configuration also extends to system fit. System air-flow can exceed minium values throughout the service life. Cabin pressure can be maintained for a sealed cab where applicable until servicing is required.

The air cleaner element of this invention includes a high dust holding capacity particulate filter stage, and a high efficient vapor and/or gas phase sorbent stage with high sorption capacity and using a non-settling, immobilized self-supporting sorbent mass. The air cleaner element also has a low pressure drop, allowing full system air flow. It may also include a cleanable particulate prefilter outer layer which will protect and increase the life of the inner particulate filter.

The air cleaner of the present invention provides for flexibility not available with prior art filter/sorbent air cleaning systems. The particulate or dust filter may be made integral with the sorbent filter, or it may be made removable therefrom so that each element can be replaced independently.

These and other advantages are provided by the present invention of a gaseous cleaner element comprising a housing having a gas inlet and a gas outlet with a gas stream formed therebetween, an immobilized mass of sorption material formed in a desired shape and mounted in the housing, the gas stream passing therethrough, and a particulate filter layer mounted in the housing adjacent to the mass, the gas stream passing therethrough, the particulate filter layer being mounted upstream of the sorption material mass.

DETAILED DESCRIPTION OF THE PREFERRED EMBODIMENT

Figure 1:
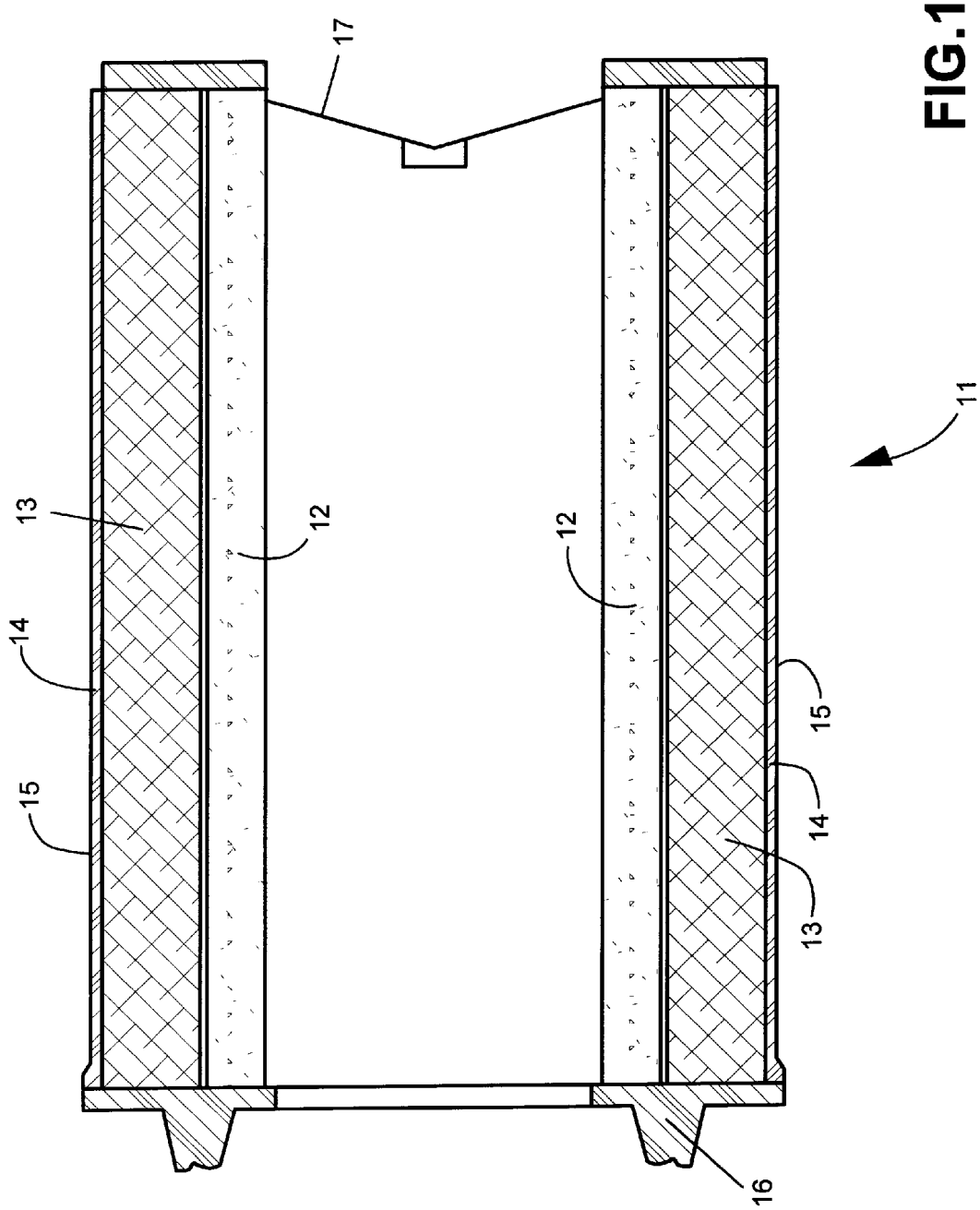
FIG. 1 is a side sectional view of the air cleaner element of the present invention.
Figure 2:
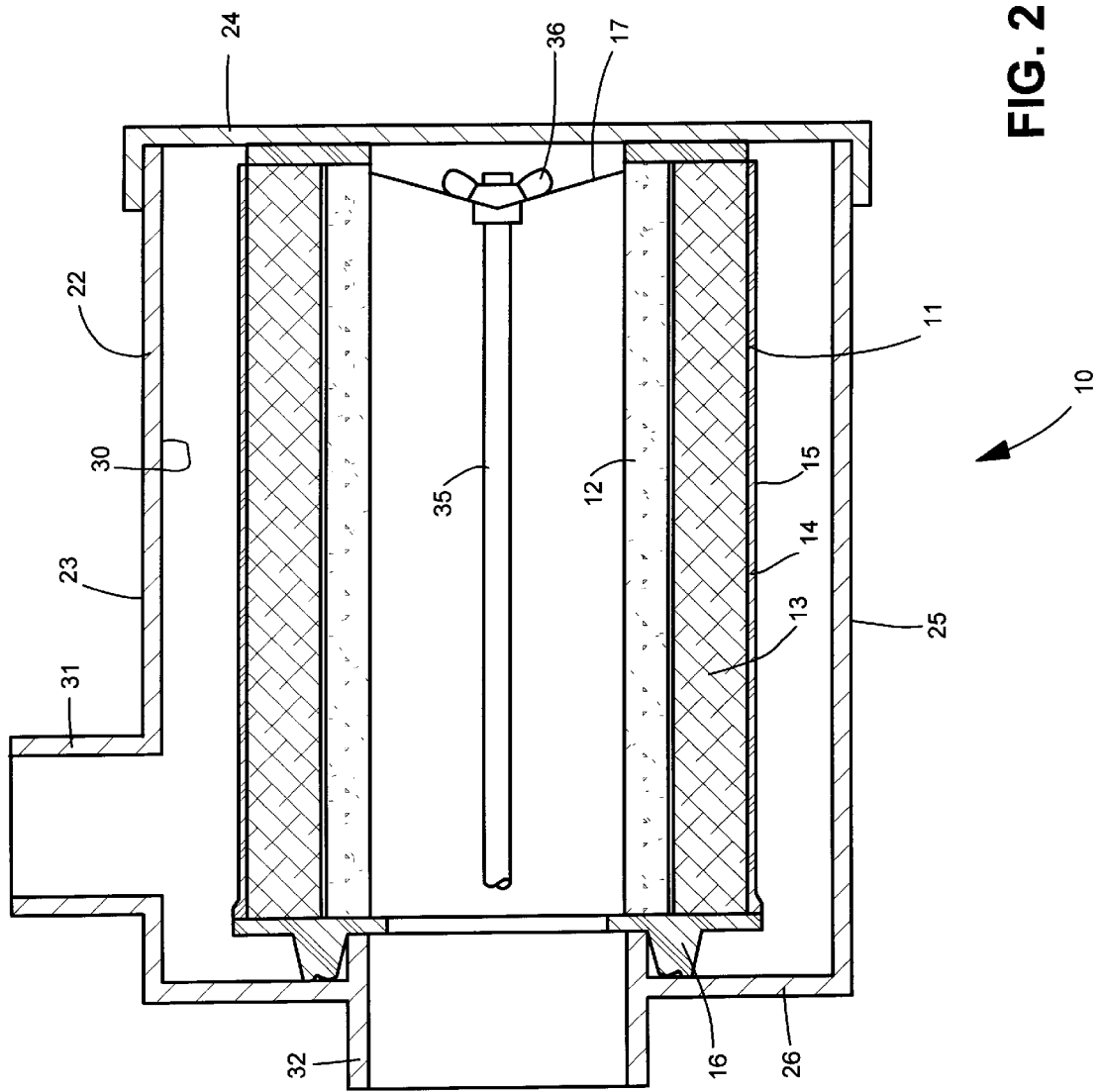
FIG. 2 is a similar side sectional view showing the air cleaner element of FIG. 1 installed in a filter housing.

Referring more particularly to the drawings and initially to FIGS. 1 and 2, there is shown an air cleaner 10 having a multiple-stage air cleaner element 11 according to one embodiment of the present invention. The air cleaner 10 shown in FIGS. 1 and 2 may be used, for example, in the air circulation system for a cabin of agricultural equipment. As shown in FIG. 1, the air cleaner element 11 includes a hollow cylinder 12 of an immobilized sorption material. Around the exterior of the sorption cylinder 12 is a cylinder 13 preferably of a pleated high efficiency particulate air (HEPA) filter medium or an ultra low penetration air (ULPA) filter medium. The pleated HEPA filter medium would preferably have an efficiency of 99.97% at 0.3 micron; this efficiency is commonly used for breathing air respirators. The pleated ULPA filter medium would have an efficiency of 99.9999% at 0.12 micron. Although a HEPA or ULPA filter is preferred, other particulate filter media may be used. The pleating increases the available filtering surface area and results in a lower pressure drop and high dust holding capacity. Stability and low pressure drop can be enhanced by using "mini-pleat" technology, in which continuous hot-melt beads are provided on the downstream side of the medium which lock the pleats in place and provide air passage between the flanks of each pleat and prevent pleat "pinch-off." A protective cylindrical screen 14 may be provided around the exterior of the cylinder 13. The screen 14 provides a base and support for the pre-filter layer and protects the HEPA or ULPA filter cylinder 13 from damage during handling. The screen 14 is preferably made from plastic netting material.

A prefilter layer 15 is preferably provided on the exterior of the screen 14. The prefilter layer 15 is a durable non-pleated outer wrap that can be removed from the element 11 for servicing or cleaning. Removal of the prefilter layer 15 from the air cleaner element 11 does not require tools; after the air cleaner element has been removed from its housing, the prefilter layer simply slides axially from the air cleaner element 11. The prefilter layer 15 improves the overall dust holding capacity and extends the life of the HEPA or ULPA filter cylinder 13. Prefilter layer 15 reduces the particular rate to the pleated filter cylinder 13 and can be re-used multiple times after cleaning.

The filter cylinder 13, the sorption cylinder 12 and the screen 14 are held in position by an end cap 16 which is molded in place, and which is made of a resilient elastomeric or plastic material. The end cap 16 is thus a molded encapsulation of the HEPA or ULPA pleated filter 13, the outer screen 14 and sorption cylinder 12. The other end of the air cleaner element 11 is covered by a plastic or metal retainer 17 which is attached and sealed to the ends of the sorption cylinder 12, the outer screen 14 and the pleated cylinder 13.

The sorption cylinder 12 is a self-supporting cylinder formed of a sorbent material as is known in the art, made by an extrusion process according to the processes described in full in U.S. Pat. Nos. 5,147,722, 5,189,092 and 5,331,037, the disclosures of which are hereby incorporated by reference in their entireties. In accordance with the disclosures in those patents, the sorbent material is provided in small particles in a uniform mixture along with a binder material which has a softening temperature which is substantially below that of the sorbent material. The uniform mixture is heated in the absence of pressure or shear sufficient to convert the binder particles to a temperature substantially above the softening point of the binder material but less than the softening temperature of the sorbent material. Thereafter, the uniform mixture is forced through an extrusion die, whereby pressure and shear are applied to the heated mixture sufficient to convert at least a portion of the binder material particles into a substantially continuous webbing structure or force formation of point-bonds. Substantially immediately after formation of the binder particles into this structure, the mixture is rapidly cooled below the softening point of the binder material to retain the converted binder material in its continuous form or forced point-bonded condition. This produces the composite material composed of sorbent particles, a binder resin phase forming a continuous web matrix or point-bonds, and a volume of empty pores. The sorbent material is thus immobilized in a self-supporting mass by the binder material, but the empty pores in the matrix provide porosity and permeability and allow air flow through the matrix and contact with the sorbent particles.

Since the cylinder 12 is a solid immobilized mass, the sorption particles in the cylinder are not subject to settling as with prior art sorption layers. The cylinder 12 is self supporting and does not require external means for support or compression to eliminate settling. In the embodiment of FIG. 1, the cylinder 12 contributes axial and radial support for the pleat pack cylinder 13 and for the entire air cleaner element 11. Permeability is high to minimize flow resistance while maintaining high sorption efficiency and capacity. Attrition of the sorbent in the cylinder 12 remains minimal through the service life of the air cleaner element 11.

The sorbent material of the cylinder 12 may be, for example, carbon. For certain applications, it may be desirable to graft a special reagent to the sorbent to create a superior affinity for certain elements, for example, alkaline gases, such as ammonia.

The air cleaner element 11 of the present invention may be installed in a conventional filter housing such as the housing 22 shown schematically in FIG. 2. The housing 22 comprises a generally cylindrical body 23 and an end cover 24. The body 23 comprises a generally cylindrical outer side portion 25 and an end portion 26 closing one end of the cylindrical side portion. The generally cylindrical side portion 25 of the body 23 defines a central axis of the air cleaner 10. The end cover 24 is removably attached to the other open end of the body 23, by suitable conventional means (not shown), which may be, for example, a wingnut or other fastener on a tie rod, clamps around the exterior of the housing, bolts or other such devices.

A separation chamber 30 is formed around the outside of the air cleaner element 11, between the air cleaner element and interior surface of the cylindrical side portion 25 of the body 23. Air enters the cleaner 10 through an air inlet 31 which can be formed in the side portion 25 of the body 23 near the end portion 26 and which extends tangentially from the axis of the air cleaner. The orientation of the air inlet 31 imparts a swirl to the air as it enters the separation chamber 30, and this swirl creates a cyclone effect in which centrifugal force causes heavier dirt particles entrained in the air to be forced to the interior wall of the side portion. The air then travels through the layers of the air cleaner element 11 and to an air outlet 32 which can be formed in the end portion 26 of the body 23 and which extends axially from the end portion. The molded end cap 16 of the air cleaner element 11 is designed to fit into the air outlet 32 of the housing and provide a sealing engagement. Gasket ridges are preferably integrated in the molded end cap 16 at the outlet. A protrusion in the end cap 16 at the outlet elevates the air cleaner element to avoid interference with any fasteners in the end portion 26 of the housing. This arrangement provides a leak free transition from the pleated and sorption cylinders 12 and 13 to the air outlet in the end portion 26 in the housing. A hole is provided in the retainer 17 to allow a threaded tie rod 35 in the housing to pass through and secure the air cleaner element 11 by means of a wing nut 36.

The prefilter element 15 can be removed and cleaned for dust. Preferably, the prefilter element is cleaned with a cold water rinse, but other cleaning methods can be used, such as shaking off the dust, bumping, using compressed air, or cleaning with water and mild detergent. The sorbent material in the cylinder 12, however, cannot be cleaned by any practical means. Adsorption can be described as condensation of vapor or gas molecules in the micropores in the sorbent. Chemisorption can be described as a chemical conversion of the gas or vapor followed by adsorption of the resulting compounds. Certain volatiles are removed from the air stream by chemical reaction or conversation with the sorbent impregnates. The resulting residues adhere to the sorbent, are adsorbed, or follow the main air stream. It is also not recommended that the HEPA or ULPA filter pleat pack of the cylinder 13 be cleaned. Although surface dust could be removed from the HEPA or ULPA medium, the fine particles are trapped inside the fibrous structure, and it is difficult to remove the trapped particles without damaging the medium.

While the air cleaner element 11 is intended to be used in an air cleaner 10 having the air inlet 31 formed in the side portion 25 of the body 23 near the end portion 26 are extending tangentially from the axis of the air cleaner, the air inlet can be placed in any other suitable location, such as along end portion 26 or even in the end cover 24. The air outlet 32 can also be at either end of the air cleaner. Similarly, while the cylindrical air cleaner element 11 of FIG. 1 is shown as an outside-in device in which the air flows from generally radially from the exterior of the air cleaner toward the interior axis, it is also possible to construct an air cleaner element according to the present invention in which the air flows in the opposite direction, entering the air cleaner generally along its axis and flowing radially outwardly through the filter layers. In such an arrangement, the pleat pack filter would be located inside the sorbent filter. Likewise, the other embodiments of this invention could also be made inside-out in a similar manner.

Figure 3:
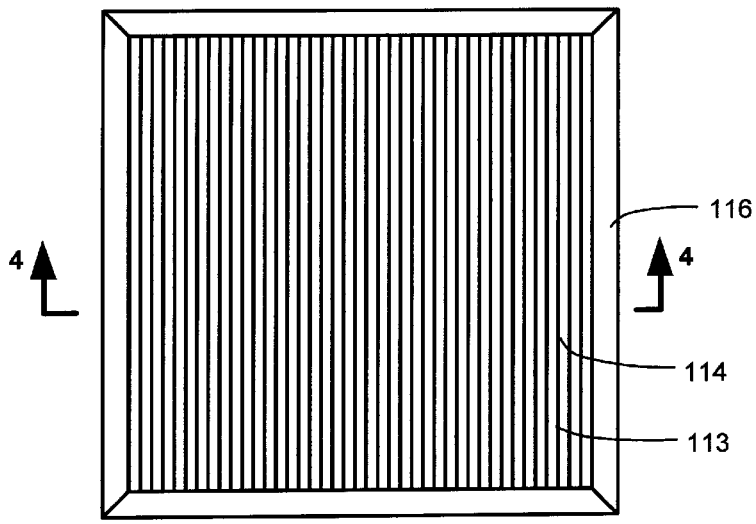
FIG. 3 is a top plan view of an air cleaner element showing another embodiment of the present invention.
Figure 4:
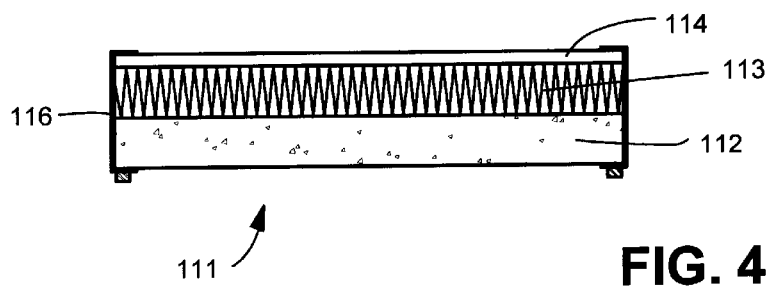
FIG. 4 is a side sectional view taken along line 4—4 of FIG. 3.
Figure 5:
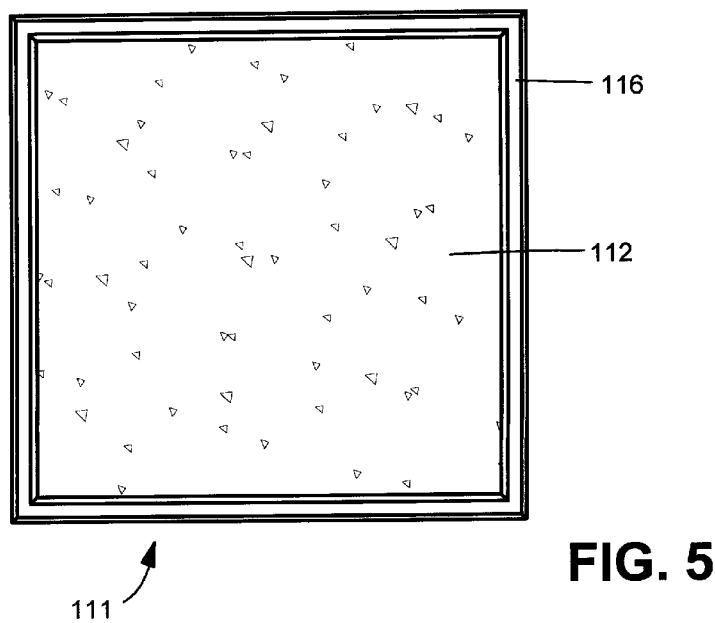
FIG. 5 is a bottom plan view of the air cleaner element of FIGS. 3 and 4.

While the invention can be embodied in a cylindrical filter element as shown in FIGS. 1 and 2, other configurations are possible. The filter of the present invention can be formed in an essentially flat panel filter element which can be used in various air systems in which flat panel filters are used. Such a flat panel is shown as the flat panel element 111 of FIGS. 3–5. The panel element 111 includes a panel of sorbent material 112 made in the same manner as the sorbent cylinder 12. On one side of the sorbent panel 112 is a pleated layer 113 of a particulate filter medium, such as a HEPA or ULPA filter medium. A protective screen 114 may be provided over the pleated layer 113, and a prefilter layer (not shown) may be provided on the exterior of the screen 114. The prefilter layer may be separately removable from the panel element 111. The sorbent panel 112, the pleated layer 113, the screen 114 and the prefilter layer 115 are mounted together in a frame 116. The dimensions of the frame 116 are preferably such that the panel 111 can be mounted in an existing system and replace a prior art filter panel, so that sorption and minute particulate capabilities can be added to existing systems without the addition of other equipment.

Figure 6:
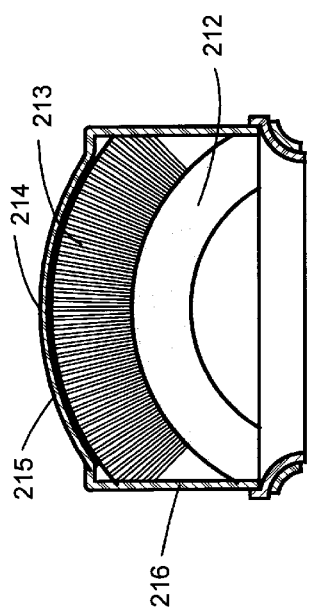
FIG. 6 is an end sectional view of an air cleaner element showing yet another embodiment of the present invention.

Further alternatively, the invention can be incorporated into an elongated curved panel filter which is essentially a partial cylinder. Such a panel 211 is shown in FIG. 6. The panel 211 is an improvement over the flat panel 111 in that the curvature of the panel provides for improved strength and support as well as providing a larger effective surface area for the air flow. The panel 211 includes a semi-cylindrical mass of sorbent material 212 made in the same manner as the sorbent cylinder 12. On the outside of the sorbent layer 212 is a semi-cylindrical pleated layer 213 of a HEPA or ULPA filter medium. A protective screen 214 may be provided over the pleated layer 213, and a prefilter layer 215 may be provided on the exterior of the screen 214. The prefilter layer 215 may be separately removable from the panel 211. The sorbent layer 212, the pleated layer 213, the screen 214 and the prefilter layer 215 are mounted together in a specially configured housing 216, which can be seen with reference to FIGS. 6 and 7. The configuration of the housing 216 is designed in order to replace conventional filter elements in existing installations.

While it is preferred that the pleat pack filter and the sorbent filter be made as an integral air cleaner element, so that the sorbent filter can help to support the pleat pack filter, it is also possible to make the pleat pack filter and the sorbent filter detachable from each other. In such an arrangement, the filter elements would be nested together in a coaxial fashion, and either of the filter elements could be removed as needed for replacement. Such an arrangement may be beneficial if, for example, the air cleaner is used in an air stream having a large amount of gaseous impurities but little particulate impurities, and the sorbent filter is in need of replacement well before the pleat pack filter. Similarly, such an arrangement would be beneficial if the air cleaner is used in an air stream having a large amount of particulate material and very little gaseous or vaporous impurities, and the pleat pack filter needs replacement well before the sorbent filter.

Figure 8:
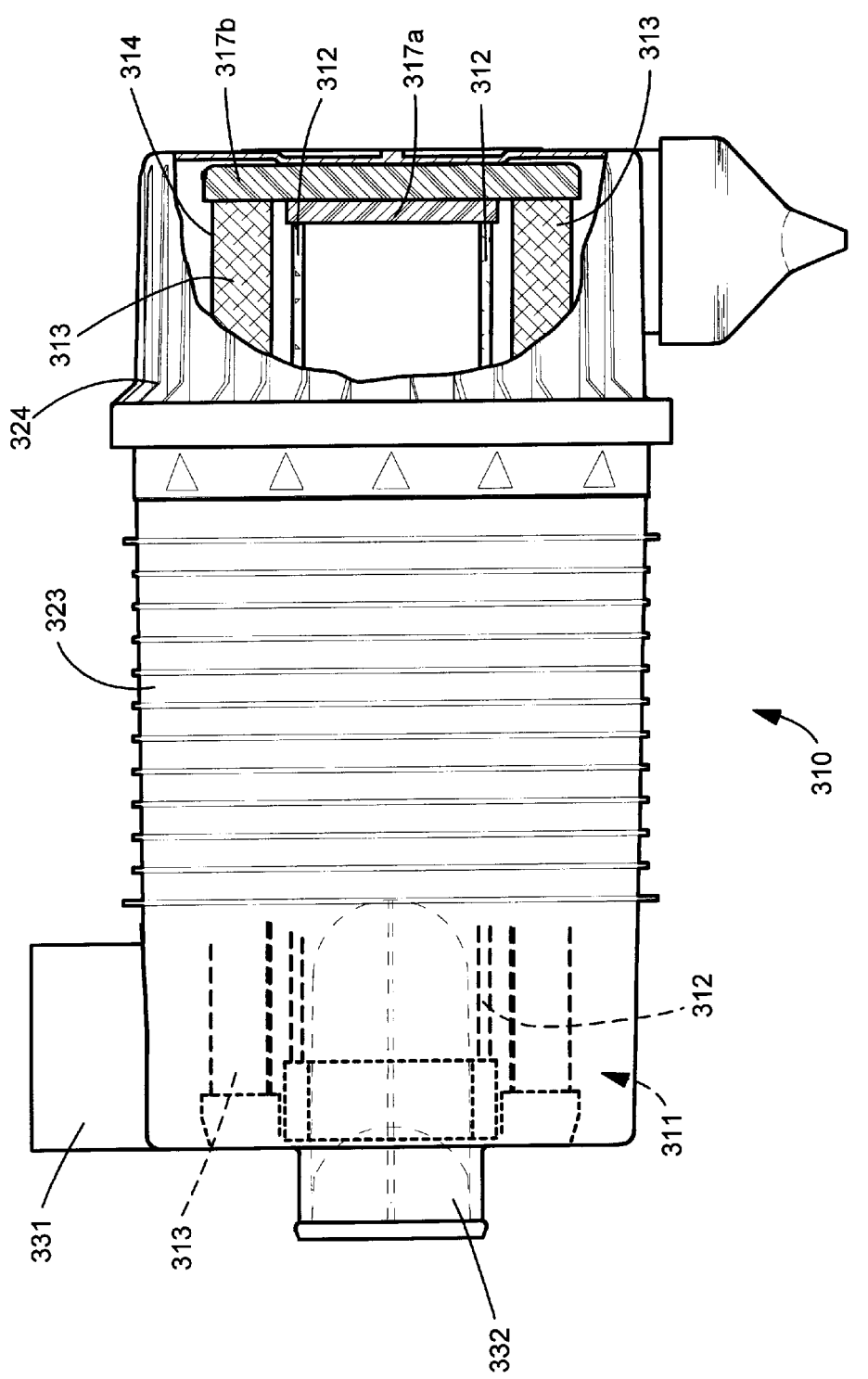
FIG. 8 is a side elevational view, partially sectioned, of an air cleaner showing yet another embodiment of the present invention.

Such an arrangement is shown by the air cleaner 310 of FIG. 8 which has an air cleaner element 311 formed of two separate parts: a cylinder 312 of sorbent material formed in the same manner as the cylinder 12, and a separate pleated cylinder 313 of a particulate filter medium, such as a HEPA or ULPA filter medium. Each of the cylinders 312 and 313 have their own end caps 317a and 317b. A protective screen 314 may be provided over the pleated cylinder 313. A prefilter layer (not shown), which may be separately removable from the air cleaner element, may be provided on the exterior of the screen 314. The air cleaner element 311 is mounted for use in an air cleaner 310 having a housing formed of a body 323 and a removable end cap 324. The housing body 323 has a tangentially extending air inlet 331 and an axially extending air outlet 332. The remaining details of the air cleaner 310 can be similar to those disclosed in detail in U.S. patent application Ser. No. 08/828,729, filed Mar. 24, 1997, now U.S. Pat. No. 5,755,842, issued May 26, 1998, to Patel et al., the disclosure of which is hereby incorporated by reference in its entirety.

Figure 7:
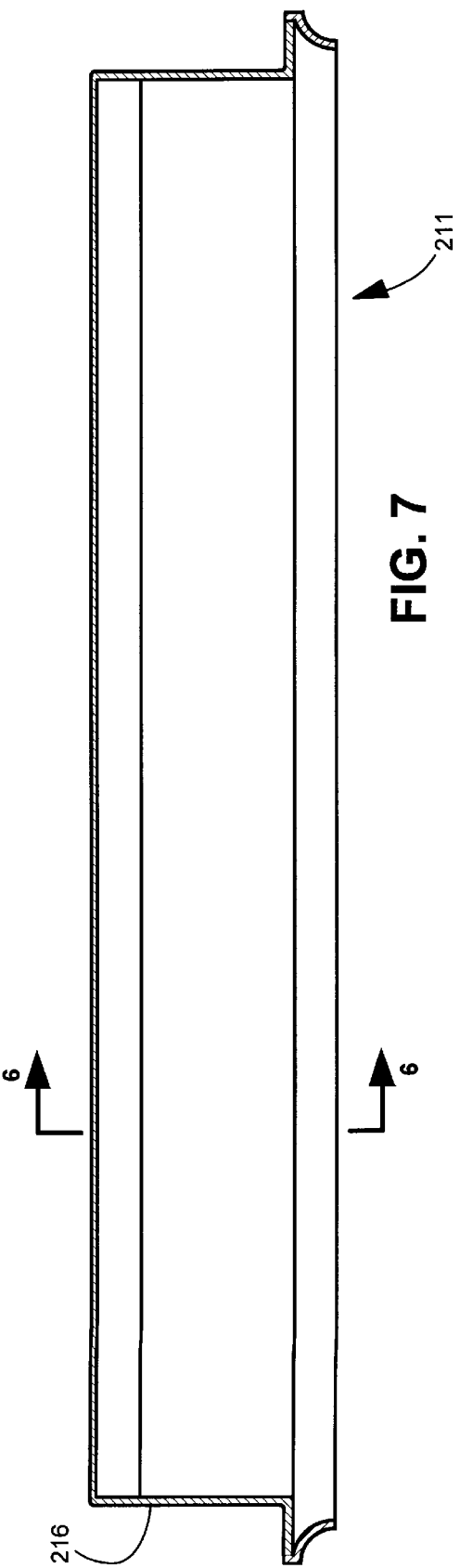
FIG. 7 is a side elevational view of the air cleaner element of FIG. 6.

While the air cleaner element and each of the filters shown in FIGS. 1 and 8 are generally cylindrical, it should be understood that other configurations are possible, such as the partial cylindrical shape of the air cleaner of FIGS. 6 and 7. The air cleaner element may even be made generally conical or frustoconical in order to increase the effective surface area of the air cleaner element.

The air cleaner of FIG. 1 has been described as being a replaceable component for a filter housing, such as the filter housing shown in FIG. 2. However, the filter element can be provided integrally with the filter housing in a single disposable filter, in a manner similar to that described in U.S. Pat. No. 5,509,948, issued to Keller et al., the disclosure of which is hereby incorporated by reference in its entirety. In accordance with the disclosure of that patent, the filter element is made integral with a sealed disposable housing made of a sturdy, yet easily disposable material such as reinforced cardboard. Instead of opening the housing to replace the filter element, the entire filter is removed from the air system and disposed of. While the disposable filter disclosed in U.S. Pat. No. 5,509,948 is a two-stage filter with a dust collection chamber, the present invention may be incorporated into a disposable filter which does not include a separate dust collection chamber as shown in that patent disclosure. The provision of an entirely disposable filter would be advantageous if the filter element of the present invention is used to collect toxic or even carcinogenic substances. The filter element of the present invention is readily fabricated without any metallic material, so that the removed filter can be incinerated.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is is inconsistent with the extent to which the progress in the art has been advanced by the invention.

What is claimed is:

1. A gaseous cleaner comprising:
   a housing having a gas inlet and a gas outlet with a gas stream formed therebetween;
   an immobilized mass of sorption material formed in a desired shape and mounted in the housing, the mass of sorption material being self-supporting, the gas stream passing through the sorption material mass;
   sealing means on opposite ends of the sorption material mass for sealing the mass to a portion of the housing, the sorption material mass being capable of supporting the sealing means and holding the sealing means in sealing engagement with the housing portion; and
   a particulate filter layer mounted in the housing adjacent to the sorption material mass, the gas stream passing therethrough, the particulate filter layer being mounted upstream of the sorption material mass.

2. A gaseous cleaner as in claim 1, wherein the particulate filter layer is supported by the sorption material mass.

3. A gaseous cleaner as in claim 1, wherein the sorption material mass includes carbon particles.

4. A gaseous cleaner as in claim 1, wherein the particulate filter layer is a HEPA filter.

5. A gaseous cleaner as in claim 1, wherein the particulate filter layer is a ULPA filter.

6. A gaseous cleaner as in claim 1, wherein the mass of sorption material is generally cylindrical.

7. A gaseous cleaner as in claim 1, comprising in addition a removable pre-filter layer adjacent to the particulate filter layer.

8. A gaseous cleaner as in claim 1, wherein the sorption material mass comprises a sorption material mixed with a binding material treated by pressure and temperature to form a porous solid mass.

9. An air cleaner element for use in a housing having an air inlet and an air outlet, the element comprising:
   an immobilized self-supporting solid, permeable mass of sorption material formed in a desired shape for mounting in the housing between the air inlet and the air outlet;
   a pleated layer of a particulate filter material mounted in the housing between the air inlet and the air outlet, the pleated layer mounted adjacent to the sorption material mass and supported thereby; and
   sealing means on opposite ends of the sorption material mass for sealing the mass and the pleated layer to a portion of the housing, the sorption material mass being capable of supporting the sealing means and holding the sealing means in a sealing engagement with the housing portion.

10. An air cleaner element as in claim 9, wherein the sorption material mass includes carbon particles.

11. An air cleaner element as in claim 9, wherein the particulate filter layer is a HEPA filter.

12. An air cleaner element as in claim 9, wherein the particulate filter layer is a ULPA filter.

13. An air cleaner element as in claim 9, wherein the mass of sorption material is generally cylindrical.

14. An air cleaner element as in claim 9, comprising in addition removable pre-filter layer adjacent to the particulate filter layer.

15. An air cleaner element as in claim 9, wherein the sorption material mass comprises a sorption material mixed with a binding material treated by pressure and temperature to form a porous solid mass.

* * * * *